(12) United States Patent
Choi et al.

(10) Patent No.: US 7,762,669 B2
(45) Date of Patent: Jul. 27, 2010

(54) DISPLAY DEVICE FOR IMPROVING AN IMAGE RESOLUTION OF PROJECTION-TYPE DISPLAY DEVICE

(75) Inventors: In Ho Choi, Sungnam-si (KR); Sam Nyol Hong, Suwon-si (KR); Young Joong Kim, Seoul (KR); Hee Sool Koo, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 1553 days.

(21) Appl. No.: 11/024,481

(22) Filed: Dec. 30, 2004

(65) Prior Publication Data
US 2006/0007057 A1    Jan. 12, 2006

(30) Foreign Application Priority Data
Jun. 1, 2004    (KR)    ................... 10-2004-0039695

(51) Int. Cl.
G03B 21/26    (2006.01)
G03B 21/28    (2006.01)
H04N 5/74    (2006.01)

(52) U.S. Cl. ................... 353/28; 353/7; 353/98; 348/771

(58) Field of Classification Search ............ 353/28, 353/98, 37; 348/771
See application file for complete search history.

(56) References Cited

U.S. PATENT DOCUMENTS

| | | | | |
|---|---|---|---|---|
| 4,057,331 | A | * | 11/1977 | Ong et al. ............... 359/224 |
| 5,550,605 | A | | 8/1996 | Haraguchi et al. |
| 5,610,752 | A | * | 3/1997 | Hayakawa ............... 359/198 |
| 5,626,411 | A | | 5/1997 | Takahashi et al. |
| 5,877,806 | A | * | 3/1999 | Kawano ................ 348/219.1 |
| 6,078,038 | A | | 6/2000 | Cooper |
| 7,136,035 | B2 | | 11/2006 | Yoshida |
| 2002/0003636 | A1 | | 1/2002 | Conner |
| 2003/0214635 | A1 | | 11/2003 | Asakura et al. |
| 2004/0021827 | A1 | | 2/2004 | Sekiguchi et al. |
| 2004/0204202 | A1 | | 10/2004 | Shimamura et al. |

(Continued)

FOREIGN PATENT DOCUMENTS

GB    1363263 A    8/1974

(Continued)

OTHER PUBLICATIONS

The Office Action for co-pending U.S. Appl. No. 11/024,773, mailed Jun. 16, 2009.

Primary Examiner—Georgia Y Epps
Assistant Examiner—Magda Cruz
(74) Attorney, Agent, or Firm—Birch, Stewart, Kolasch & Birch, LLP

(57) ABSTRACT

A system for improving the resolution of a display device by using human visual characteristics wherein an image can be displayed at a more improved resolution than an actual physical resolution, thereby achieving the same effect as that where the resolution is physically improved. An image signal corresponding to one frame is separated into a first image signal and a second image signal, and a first image and a second image are formed based on the first image signal and the second image signal. The first image and the second image are respectively displayed at a first location and a second location. As a result, a viewer can view the image with an improved resolution.

27 Claims, 11 Drawing Sheets

U.S. PATENT DOCUMENTS

| | | |
|---|---|---|
| 2005/0128438 A1* | 6/2005 | Kang et al. .................. 353/69 |
| 2005/0190291 A1 | 9/2005 | Kota et al. |
| 2006/0152106 A1 | 7/2006 | Yan et al. |

FOREIGN PATENT DOCUMENTS

| | | |
|---|---|---|
| GB | 2115576 A | 9/1983 |
| JP | 7-43672 A | 2/1995 |
| JP | 7-104278 A | 4/1995 |
| JP | 09-152572 A | 6/1997 |
| JP | 10-003057 A | 1/1998 |
| JP | 11-002780 A | 1/1999 |
| JP | 2002-287082 A | 10/2002 |
| JP | 2002-335471 A | 11/2002 |

* cited by examiner

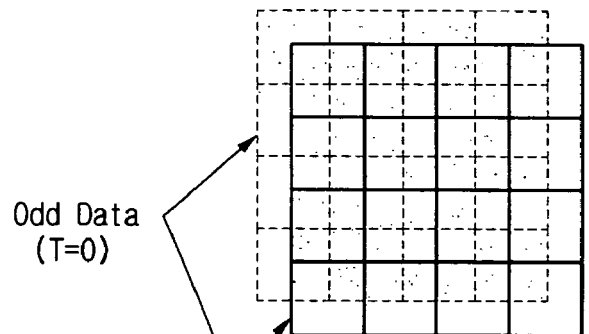
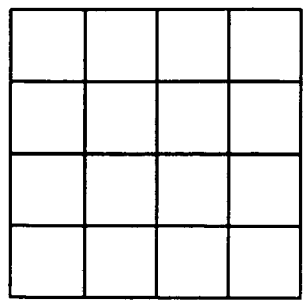
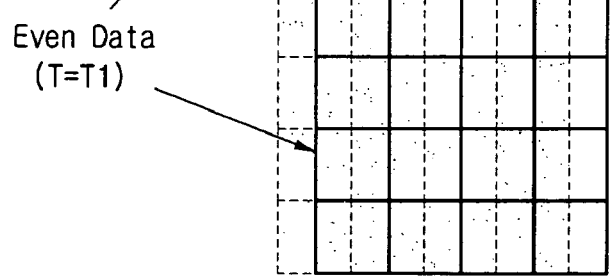

Image signal of one frame
(T=0~T1)

(T=0~T1)

Odd Data Image

Even Data Image bsp;# DISPLAY DEVICE FOR IMPROVING AN IMAGE RESOLUTION OF PROJECTION-TYPE DISPLAY DEVICE This application claims the priority benefit of Korean Patent Application No. 39695/2004 filed Jun. 1, 2004 which is herein incorporated by reference.

BACKGROUND OF THE INVENTION

1. Field of the Invention

The present invention relates to a display device, and more particularly, to a display device having a resolution improving apparatus which is capable of effectively improving the resolution of a projection-type display device.

2. Description of the Related Art

Recently, display devices tend to be lightweight, slim and large-sized. Specifically, large-screen display devices have become important in the display fields.

With the advent of digital broadcasting, a projection-type display device requires a high resolution.

SUMMARY OF THE INVENTION

Accordingly, the present invention is directed to a display device that substantially obviates one or more problems due to limitations and disadvantages of the related art.

An object of the present invention is to provide a display device having a resolution improving apparatus for effectively improving the resolution of the display device.

Another object of the present invention is to provide a display device having a resolution improving apparatus, which can be accurately driven.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes: a light source; an image forming unit for forming an image by using light emitted from the light source and an inputted image signal; a projection unit for projecting the image formed by the image forming unit onto a screen; a movable displacement unit for displacing the image displayed onto the screen; and a driving unit for driving the displacement unit, the driving unit including a coil, an iron fragment, and a dipole magnet.

In another aspect of the present invention, the display device includes: a light source; an image forming unit for forming an image by using light emitted from the light source and an inputted image signal; a projection unit for projecting the image formed by the image forming unit onto a screen; an optical path changing unit disposed in an optical path through which the image is projected, for changing an optical path; and a driving unit for driving the optical path changing unit, wherein the optical path changing unit includes a fixing member disposed in the optical path, and a rotating member rotatably coupled to the fixing member and to which a displacement plate is fixed, and the driving unit includes a coil and an iron fragment disposed at one of the fixing member and the rotating member, and a dipole magnet disposed at the other of the fixing member or the rotating member.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5(a)-5(c) and 6(a)-6(b) are views illustrating different examples of a displacement of light projected onto a screen depending on the motion of a displacement plate in the display device according to the present invention;

DETAILED DESCRIPTION OF THE INVENTION

Reference will now be made to detailed embodiments of the present invention, examples of which are illustrated in the accompanying drawings. Wherever possible, the same reference numbers will be used throughout the drawings to refer to the same or like parts.

A resolution is the number of pixels per square inch on a display device. That is, the resolution is used as a scale representing precision in displaying an image.

In order to improve the resolution, a conventional display device uses a physical method of increasing the number of pixels. However, the present invention improves the resolution by using human's visual characteristics.

According to the present invention, an image can be viewed at a more improved resolution compared with an actual physical resolution, thereby obtaining the same effect that the resolution is physically improved.

Although described below in detail, an image signal corresponding to one frame is separated into sub images, e.g., a first image signal and a second image signal. The first image signal and the second signal are respectively displayed as a first image and a second image at a first position and a second position of a screen in sequence, such that a viewer feels as if the resolution is improved due to the viewer's visual characteristics.

For example, the first position and the second position on the screen may have a gap below or above a size of one pixel and may be spaced apart in a vertical, horizontal or diagonal direction.

Specifically, according to the present invention, an optical path changing unit is used to make the first image and the second image to be displayed respectively at the first position and the second position of the screen.

The optical path changing unit uses a light transmitting element and the optical path is changing depending on the displacement position and displacement angle of the light transmitting element.

Figure 1:
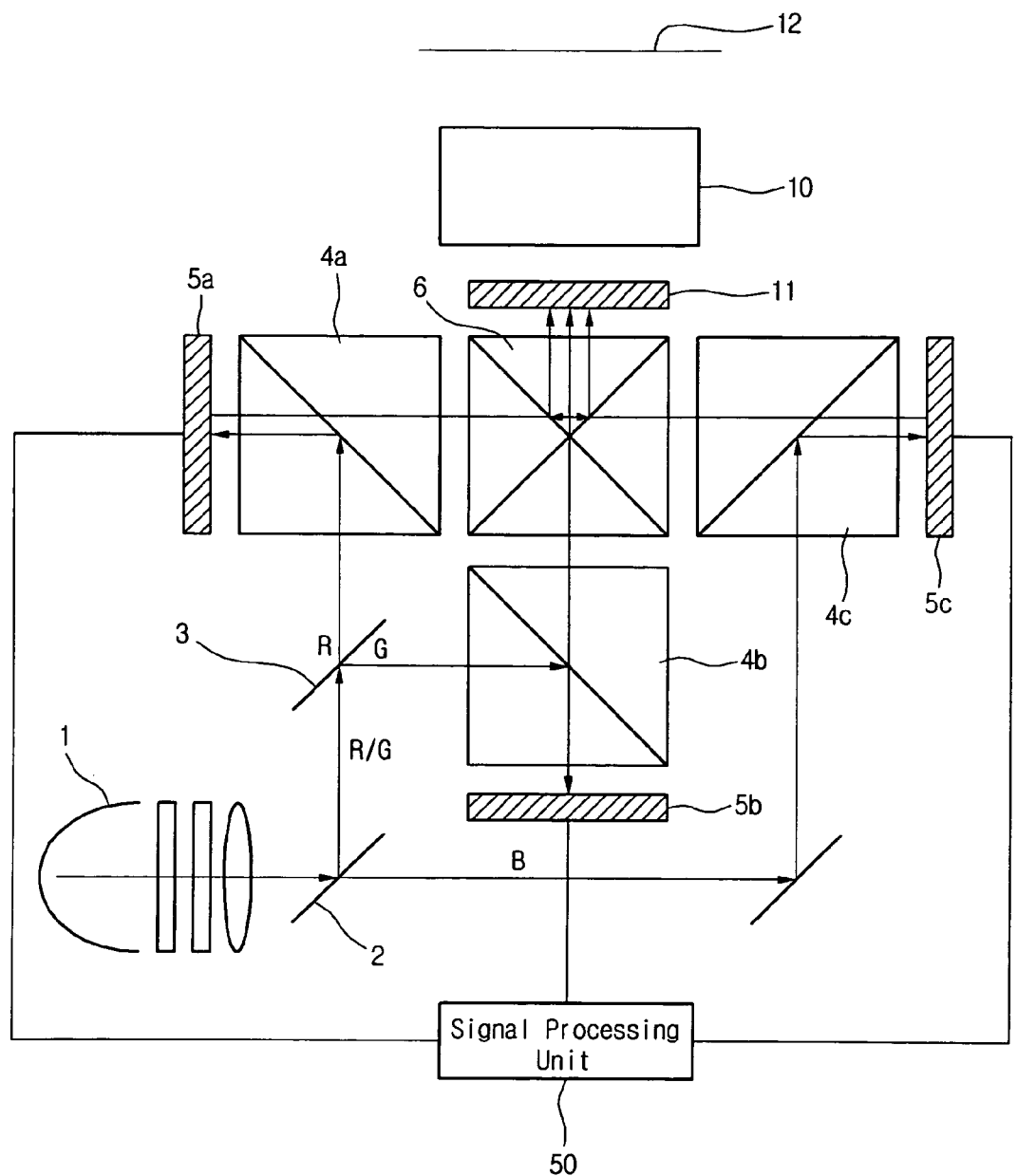
FIG. 1 is a view illustrating a display device used in conjunction with the resolution improving apparatus of the present invention.

FIG. 1 is a view of a display device containing a resolution improving apparatus according to an embodiment of the present invention.

In FIG. 1, there is shown an illuminating system of a projection TV using a reflection-type liquid crystal display (LCD). In the reflection-type illuminating system of a 3 PBS (polarized beam splitter) system shown in FIG. 1, a light irradiated from a lamp 1 passes through a condensing lens and is incident on a first dichroic mirror 2. The first dichroic mirror 2 reflects red and green lights R and G and transmits a blue light B.

The reflected red and green lights R and G are incident on a second dichroic mirror 3. The second dichroic mirror 3 transmits the red light R to a first PBS 4a and reflect the green light G onto a second PBS 4b. The blue light B from the first dichroic mirror 2 impinges on a third PBS 4C, e.g., through a reflecting mirror. As a result, the red, green and blue light R, G and B are respectively incident on the first, second and third PBSs 4a, 4b and 4c, which are disposed in front of first, second and third LCD panels 5a, 5b and 5c, respectively.

The red, green and blue light R, G and B incident on the first, second and third PBSs 4a, 4b and 4c are reflected and then incident on the first, second and third LCD panels 5a, 5b and 5c, respectively. Phases of the red, green and blue lights R, G and B are changed respectively by the first, second and third LCD panels 5a, 5b and 5c. Then, the red, green and blue lights R, G and B having the changed phases are reflected from the LCD panels 5a, 5b and 5c and transmitted respectively through the first, second and third PBSs 4a, 4b and 4c.

Images are displayed on the first, second and third LCD panels 5a, 5b and 5c, depending on image signals inputted from a signal processing unit 50.

The red, green and blue images, transmitted through the first, second and third LCD panels 5a, 5b and 5c and then through the first, second and third PBSs 4a, 4b and 4c, are combined by an X-prism 6. Then, the combined images pass through a displacement plate 11 and are incident on a projection lens 10. The images passing through the projection lens 10 are projected onto a screen 12. All of the components of the illuminating system in FIG. 1 are operatively coupled.

At this point, the displacement plate 11 may be disposed between the X-prism 6 and the projection lens 10, or between the projection lens 10 and the screen 12.

The displacement plate 11 is a thin-plate shaped element that can transmit light and is movable during the operation of the display device. For example, the position and/or angle of the displacement plate 11 can be moved periodically using mechanical means. A higher resolution can be implemented by changing the position or angle of the displacement plate 11.

In addition, although the illuminating system using the reflection-type LCD, the dichroic mirror and the PBSs is shown in FIG. 1, a transmission-type LCD instead of the reflection-type LCD can also be used. A liquid crystal on silicon (LCOS) can also be used as the reflection-type LCD.

Further, although three LCD panels are shown in FIG. 1, only one LCD panel can also be used and a structure of the optical system can be variously modified.

Furthermore, the present invention can be applied to a projector as well as a projection TV.

That is, the present invention may be embodied in many different forms and should not be construed as being limited to the embodiments set forth herein.

Figure 2:
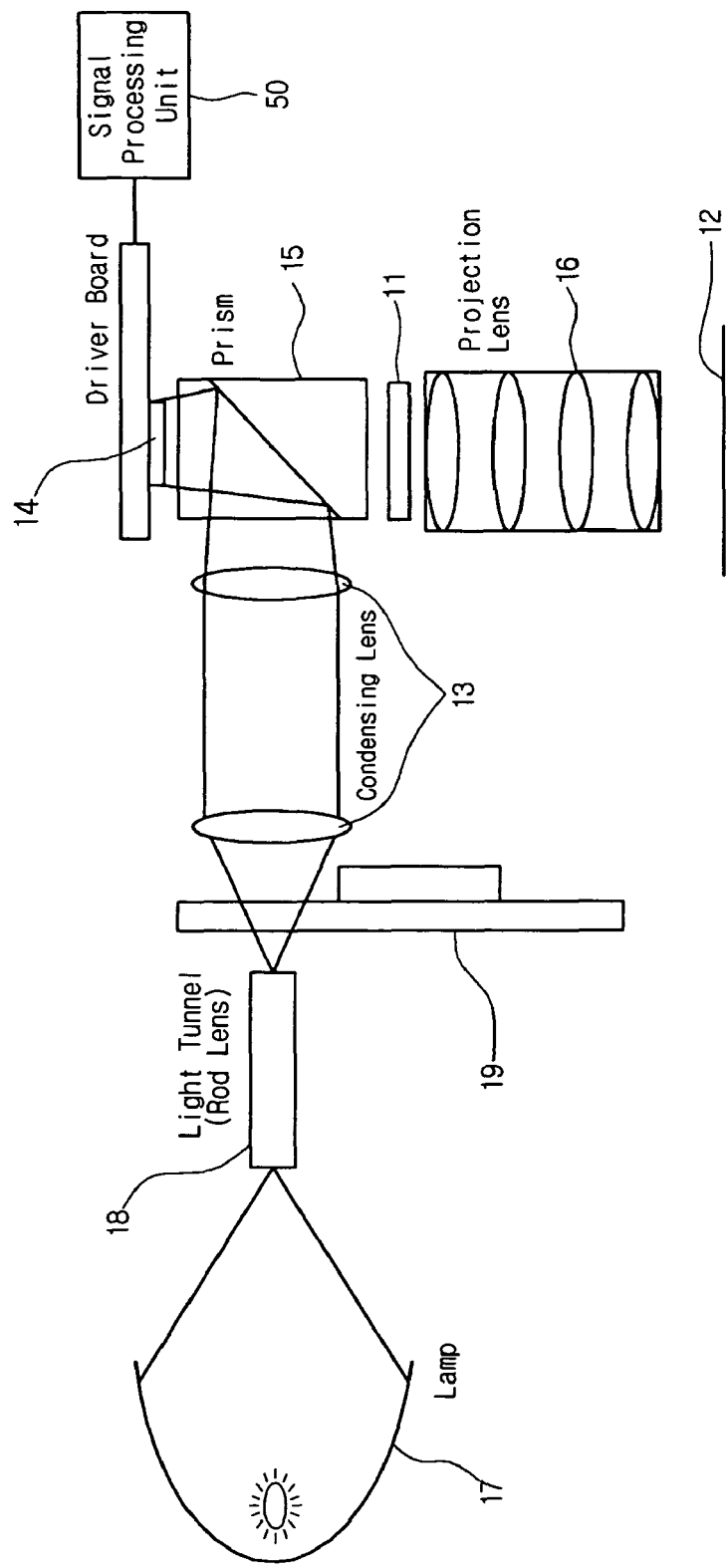
FIG. 2 is a view illustrating the display device used in conjunction with the resolution improving apparatus of the present invention.

FIG. 2 is a view illustrating a display device according to another embodiment of the present invention. More specifically, a digital light processing (DLP) optical system according to the present invention will be described below in detail with reference to FIG. 2.

The DLP optical system provides light to be irradiated to a digital micromirror device (DMD) 14 and determines whether to allow respective micromirrors in the DMD 14 to irradiate the light to a screen in an on-state or to irradiate the light to a non-screen in an off-state, depending on image signals, e.g., from a signal processing unit 50.

Referring to FIG. 2, the DLP optical system includes a lamp 17, a rod lens 18, a color wheel 19, a condensing lens 13, a prism 15, a DMD 14, a displacement plate 11, and a projection lens 16. All of the components of the system are operatively coupled. The lamp 17 generates light and the rod lens 18 transmits the light generated from the lamp 17. The color wheel 19 separates the white light passing through the rod lens 18 into red, green and blue light. The condensing lens 13 condenses the light passing through the color wheel 19 and the prism 15 reflects the condensed lights onto the DMD 14. The DMD 14 irradiates the impinging light to the displacement plate 11 through the prisms 15. The displacement plate 11 displaces the light reflected from the DMD 14, depending on time. As in FIG. 1, the position and/or angle of the displacement plate 11 here is moved periodically or as desired using mechanical means. The projection lens 16 magnifies the lights passing through the displacement plate 11 and projects the magnified lights onto a screen 12.

Based on such a structure, an operation of the DLP optical system will be described below. A white light emitted from the lamp 17 is focused by an inner curvature of a reflector and the focused light passes through a light tunnel or rod lens 18.

The rod lens 18 is provided by attaching four small and elongated mirrors to one another. The light passing through the rod lens 18 is scattered and reflected such that brightness is uniformly distributed.

The brightness of light that will be finally projected onto the screen 12 needs to be uniform. The rod lens 18 performs this function so that it is an important optical element in a projection-type display device.

The light passing through the rod lens 18 is transmitted through the color wheel 19 for the color separation. The color wheel 19 rotates according to a vertical synchronization of the image.

Then, the light passes through the condensing lens 13 and is reflected by the prism 15, so that the light is directed to the DMD 14. The prism 15 can totally reflect or transmit the light, depending on an incident angle of the light.

The light incident on the DMD 14 is redirected toward the screen 12, depending on the on/off state of the micromirrors of the DMD 14 controlled in response to sampled pixel values. The DMD 14 changes into the on- or off-state depending on the image signals inputted from the signal processing unit 50. In this manner, a predetermined image is formed.

The image reflected from the DMD 14 and directed to the screen 12 passes through the displacement plate 11 and the projection lens 16. In this course, the image is enlarged and projected onto the large screen 12.

The displacement plate 11 may be disposed between the prism 15 and the projection lens 16, or between the screen 12 and the projection lens 16.

Also, the displacement plate 11 may be disposed between the DMD 14 and the prism 15.

The light is projected onto different locations on the screen 12 depending on the periodical change in the positions and/or angles of the displacement plate 11.

According to the embodiments of FIGS. 1 and 2, the displacement plate 11 may be disposed at a predetermined position between the screen and the image forming unit for forming the image through the R, G and B combination. Depending on how and/or where the displacement plate 11 is positioned, the light can be projected at different locations on the screen 12.

Meanwhile, in the image forming unit shown in FIGS. 1 and 2, the image signal corresponding to one frame is separated into the first image signal and the second image signal by the signal processing unit 50. Then, the first image signal and the second image signal are transformed as the first image and the second image by the R, G and B combination, respectively.

In FIG. 1, the image forming unit may be provided with the first, second and third LCD panels 5a, 5b and 5c, the first, second and third PBSs 4a, 4b and 4c and the X-prism 6.

In FIG. 2, the image forming unit may be provided with the color wheel 19, the condensing lens 13 and the DMD 14.

That is, the image signal corresponding to one frame is separated into a plurality of image signals and processed into a plurality of images and then displayed. The image signal corresponding to one frame may be separated into "n" image signals and processed into "n" images and then displayed at "n" or less different positions on the screen.

According to the present invention, a display time of one image is equal to a time given by dividing a display time of one frame image by the number of images.

However, the present invention can make the viewer feel as if the resolution is improved by separating the image signal corresponding to one frame into the first image signal and the second image signal, processing the first image signal and the second image signal into the first image and the second image and then sequentially displaying the first image and the second image at first and second positions of the screen.

Figure 3:
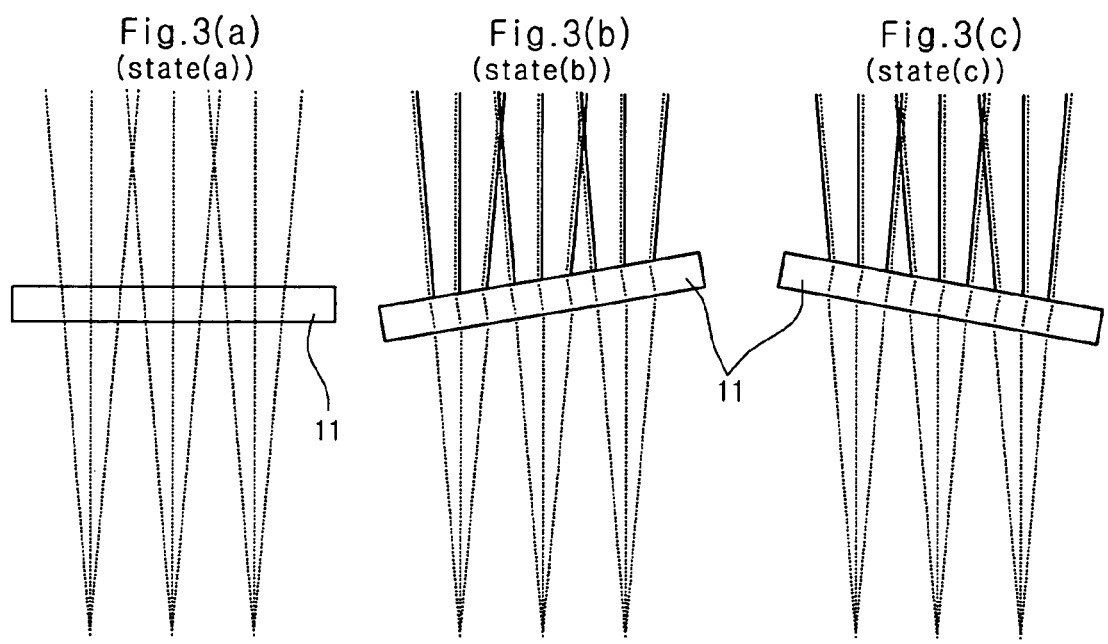
FIGS. 3(a)-3(c) are views illustrating examples of an operation of a displacement plate in the display device of FIGS. 1 and 2 according to the present invention.

FIGS. 3(*a*)-3(*c*) are examples of views illustrating an operation of the displacement plate in the display device, e.g., as shown in FIG. 1 or 2, according to the present invention. Particularly, FIG. 3(*a*) shows a case where there is no displacement plate 11 or there is no motion/angle of the displacement plate 11. In this case, the image projected from the prism or the projection lens is displayed at the same position of the screen. FIG. 3(*b*) shows the case where the displacement plate 11 is rotated in a counterclockwise direction, and FIG. 3(*c*) shows the case wherein the displacement plate 11 is rotated in a clockwise direction.

If the displacement plate 11 changes from state (a) to the state (b) or (c), the image is refracted while passing through the displacement plate 11, such that the image is displayed at a different location on the screen. That is, since the displacement plate 11 functions as an optical path changing unit, the projected image is displaced due to the displacement plate 11 and is thus displayed onto a different position of the screen depending on the motion/angle of the displacement plate 11. The displacement distance of the image displayed on the screen may be less than the size of one pixel. Thus, the displacement plate 11 according to the present invention acts as an image displacement unit to displace the image to be displayed onto different positions of the screen.

Figure 4:
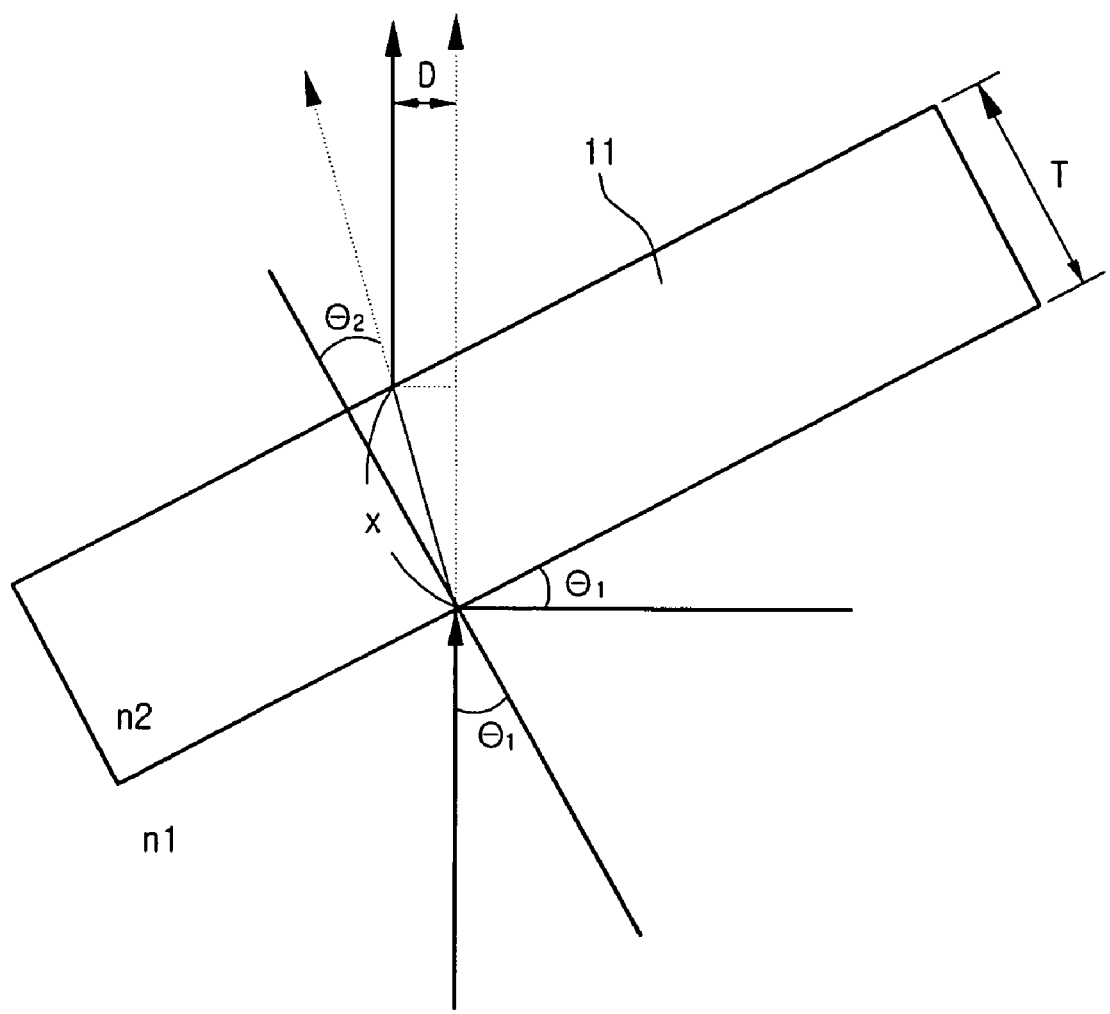
FIG. 4 is a view illustrating an operation principle of the displacement plate acting as an image displacement unit in the display device of FIGS. 1 and 2 according to the present invention.

FIG. 4 is a view illustrating the operation principle of the displacement plate acting as an image displacement unit in the display device according to the present invention.

The degree of motion of the light on the screen 12 can be calculated depending on the displacement plate's thickness T, tilt angle (light incident angle) $\Theta_1$ and refractive index $n_2$. The displacement plate's thickness, tilt angle and refractive index can be determined depending on the required motion degree of the light on the screen 12.

The displacement plate's thickness, tilt angle and refractive index can be derived from Snell's law given by Equation 1 below.

$$n_1 \sin\theta_1 = n_2 \sin\theta_2 \qquad \text{[Equation 1]}$$

where, $n_1$ is the refractive index of air;
$n_2$ is the refractive index of the displacement plate;
$\theta_1$ is the incident angle of light; and
$\theta_2$ is the refraction angle of light.

Thus, the optical path difference D between the lights passing through the displacement plate 11 can be given by Equation 2 below.

$$D = \frac{T}{\cos\theta_2}\sin(\theta_1 - \theta_2) \qquad \text{[Equation 2]}$$

$$\cos\theta_2 = \frac{T}{x}, \sin(\theta_1 - \theta_2) = \frac{D}{x}, \theta_2 = \sin^{-1}\left(\frac{n_1 \sin\theta_1}{n_2}\right)$$

where T is the thickness of the displacement plate;
$n_1$ is the refractive index of air;
$n_2$ is the refractive index of the displacement plate;
$\theta_1$ is the incident angle of light;
$\theta_2$ is the refraction angle of light; and
x is the length of the optical path of the refracted light within the displacement plate.

In addition, the optical path difference D between the lights passing through the displacement plate 11 determines the displacement of the light actually displayed onto the screen 12, depending on magnification of the projection lens.

It is preferable that the refractive index ($n_2$) of the displacement plate 11 falls within the range of from 1.4 to 2.0. But the invention covers other ranges.

In the examples of FIGS. 1 and 2, the present invention uses the light transmitting element and the light refraction, e.g., the displacement plate 11, to make the optical path difference D.

A reflection mirror may be used to change the optical path. That is, if the reflection angle of the light is changed, the optical path of the reflected light can be changed depending on the angles of the reflection mirror as disposed on the optical path.

According to the method of changing the optical path using the reflection, the change in the optical path is sensitive to the change in the angle of the reflection mirror, compared with the method of changing the optical path using the light refraction. Therefore, a precise control is required if the reflection is used to change the optical path.

According to the present invention, the displacement degree of the image may be more than or less than a size of one pixel. However, since the displacement degree of the image is small, the optical path changing unit must be precisely controlled so that the image projected from the projection lens can be displaced within a small range.

Therefore, the optical path changing unit using the light transmitting element, e.g., the displacement plate 11 has advantages in that it can be easily manufactured and the error probability is greatly reduced.

Specifically, as shown in FIG. 4, if the light is incident onto the same position of the light transmitting element, such as the displacement plate 11, the optical path difference D occurs but the traveling direction of the light does not change. On the other hand, in the case of the reflection mirror to change the light path, even if the light is incident onto the same position of the reflection mirror, the traveling direction of the light is changed depending on the angles of the reflection mirror, such that more precise control over the positioning of the reflection mirror and any of the factors is required.

Figure 6A:
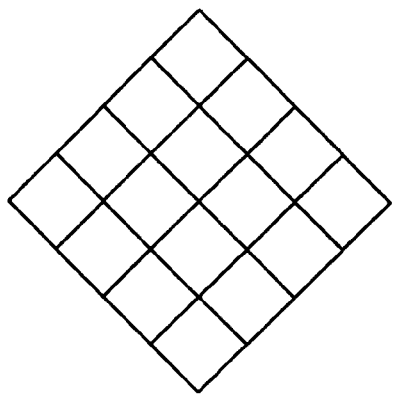
Figure 6B:
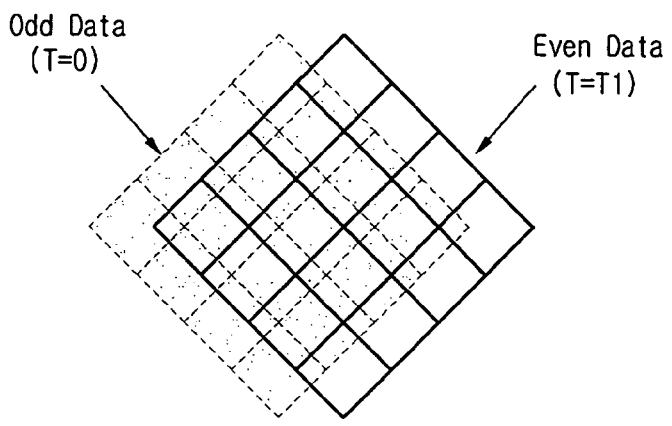

FIGS. 5(a) and 6(b) are views illustrating the displacement of light projected onto the screen depending on the motion of the displacement plate in the display device, e.g., as shown in FIGS. 1 and 2, according to the present invention. In these figures, T and T1 represent time.

Referring to FIGS. 5(a)-5(c), in the display device having a rectangular pixel structure, the displacement plate 11 periodically moves and thus the positioning of the image on the screen 12 moves.

Referring to FIG. 5(a), conventionally an image is displayed at the same corresponding positions on the screen during a predetermined time (T=0–T1). However, referring to FIGS. 5(b) and 5(c), different images are displayed at different positions on the screen at time T=0 and T=T1. Thus, a double resolution can be recognized using the same number of pixels.

For example, the image signal of one frame is separated into the first and second image signals as discussed above. Then, when the image of one frame is to be displayed, the first and second image signals are displayed in sequence as first and second images of the original image with such images displaced from each other on the screen.

In one example, assume that the same image information is displayed during 1/60 second in the related art. Now according to the present invention, the image information is separated into a first image information and a second image information, and then the first image information and the second image information are respectively and sequentially displayed at the first and second positions on the screen, each image information for 1/120 of a second.

Figure 7A:
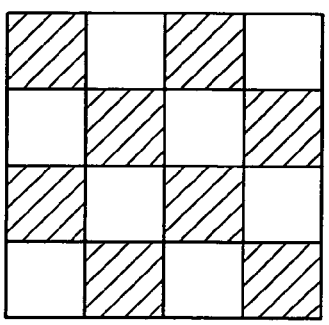
FIGS. 7(a)-7(b) are, respectively, displayable views of a first image and a second image using the display device of FIGS. 1 and 2 according to the present invention.
Figure 7B:
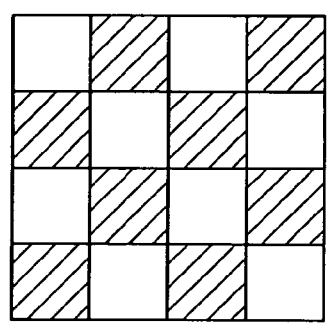

FIGS. 7(a) and 7(b) are respectively exemplary views of a first image and a second image separated from the image corresponding to one frame according to the present invention.

As shown in FIGS. 7(a) and 7(b), the image corresponding to one frame can be separated into the first image (e.g., odd data) and the second image (e.g., even data image), and the first image and the second image can be separated depending on the positions of the pixels.

The positions at which the first image (odd data) and the second image (even data) are displayed differ from each other and such displacement can be displaced by the displacement plate 11, as discussed above.

Returning to FIG. 5(b), in this example the display positions of the first image (odd data) and the second image (even data) are displaced from each other in a diagonal direction. That is, at time T=0, the first image (odd data image) of the original image is displayed at a first location on the screen for a certain duration. Then at time T=T1, the second image (even data image) of the original image is displayed at a second location on the screen for a certain duration. The second location is displaced from the first location in a diagonal direction. In the example of FIG. 5(c), the display positions of the first image (odd data) and the second image (even data) are displaced from each other in a horizontal direction. Such displacement can be made by moving the position/angle of the displacement plate or reflection mirror as discussed above.

FIGS. 6(a)-6(b) show the position of an image displayed onto the screen depending on time in a rhombus pixel structure.

Referring to FIG. 6(a), conventionally an image is displayed at the same corresponding position on the screen during a predetermined time (T=0–T1). However, referring to FIG. 6(b), according to the present invention different images are displayed at different positions of the screen at time T=0 and T=T1. Thus, according to the present invention, a double resolution can be achieved using the same number of pixels. As a variation, the different images may be displayed at the same time.

Accordingly, the present invention separates an image into two or more sub-images (e.g., odd data image and even data image) and displaces them from each other using an optical path changing unit (e.g., displacement plate or reflecting mirror), such that the displaced sub-images are displaced sequentially or in some order on the screen. This increases resolution and has the same visual effect of physically increasing the number of pixels on the display device. This effect is shown as an example in FIGS. 3(b) and 3(c).

Figure 8:
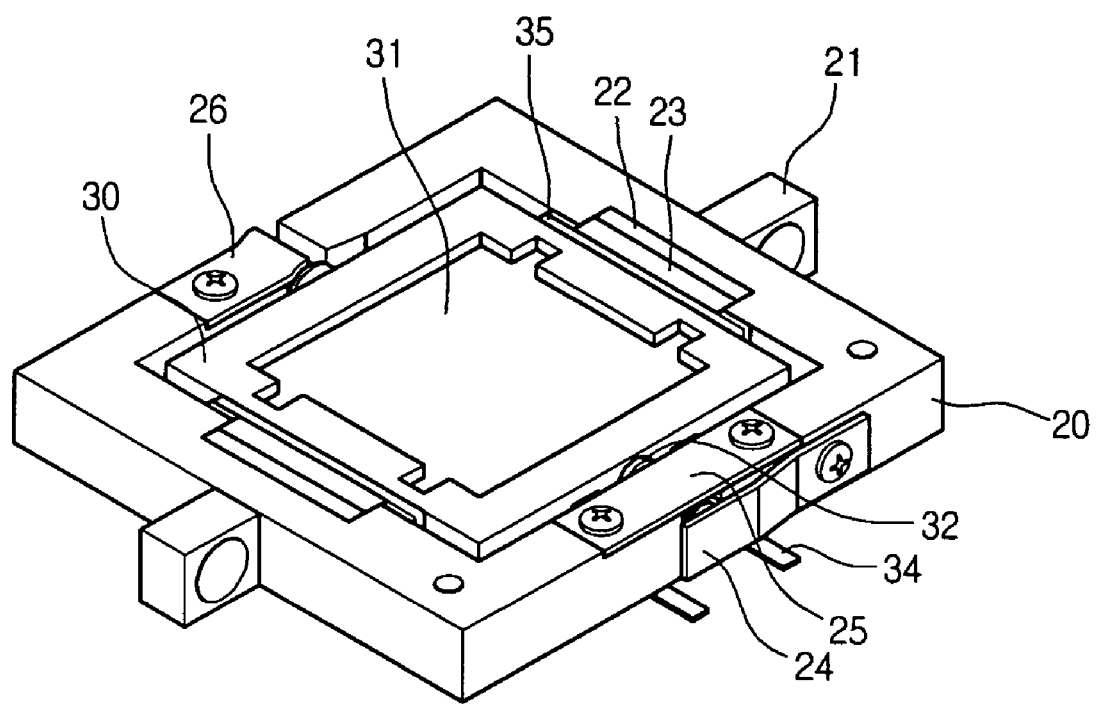
FIG. 8 is a perspective view of the resolution improving apparatus according to the present invention.
Figure 9:
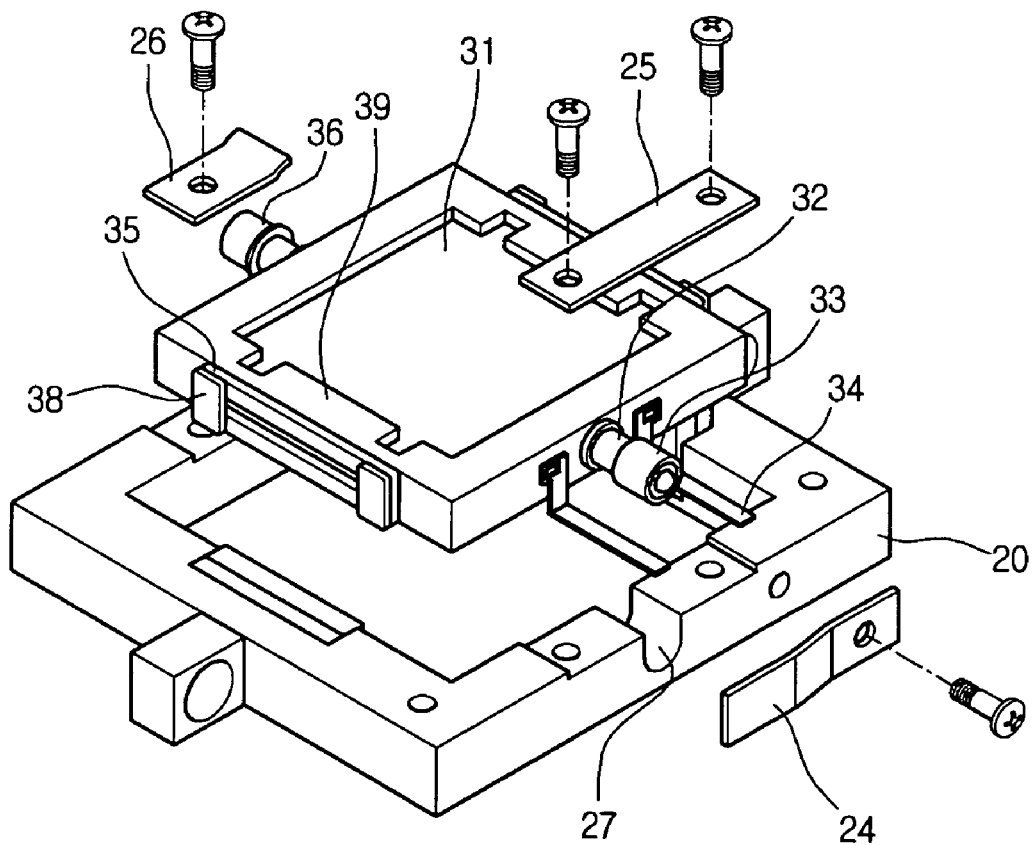
FIG. 9 is an exploded perspective view of the resolution improving apparatus shown in FIG. 8.

FIG. 8 is a perspective view of a resolution improving apparatus, i.e., an actuator for improving the resolution of a display device according to the present invention, and FIG. 9 is an exploded perspective view of the resolution improving apparatus (actuator) shown in FIG. 8.

Figure 10:
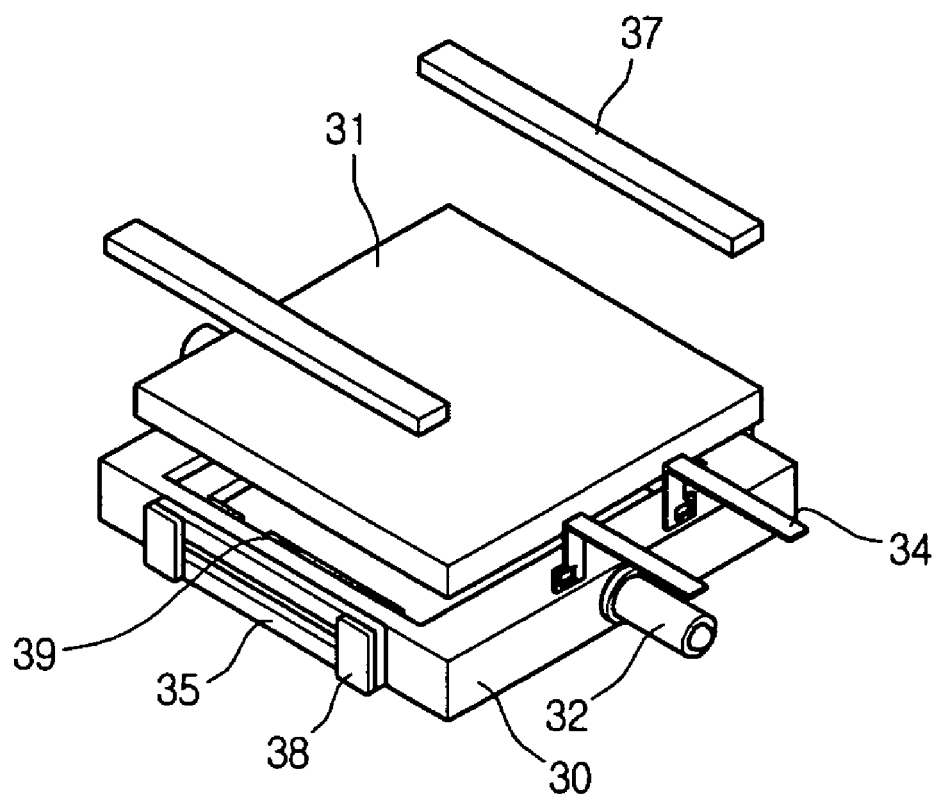
FIG. 10 is a bottom exploded perspective view of the rotating member according to the present invention.
Figure 11:
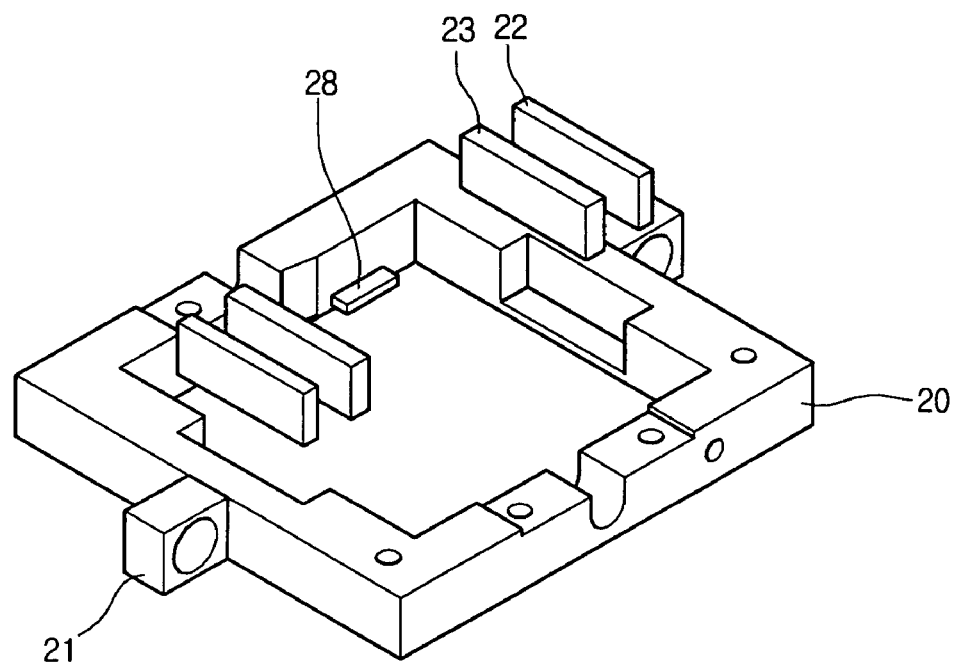
FIG. 11 is an en exploded perspective view of a fixing member according to the present invention.

FIG. 10 is a bottom exploded perspective view of a rotating member in the actuator according to the present invention, and FIG. 11 is an en exploded perspective view of a fixing member according to the present invention.

Referring to FIGS. 8 to 11, the resolution improving apparatus (actuator) for improving the resolution of a display device includes a fixing member 20 and a rotating member 30.

The fixing member 20 is disposed on an optical path between an image forming unit and a screen and has a fixing part 21 at a side such that it can fix the actuator. Although a screw hole is shown in the drawings, other members can also be used to fix the fixing member within the display device.

Thus, the fixing member 20 is firmly fixed to the resolution improving apparatus in the optical path.

In addition, a magnet 23 and a yoke 22 are formed at a side of the fixing member 20. Preferably, the magnet 23 and the yoke 23 can be formed on one side or both sides of the fixing member 20.

The magnet 23 may be a dipole magnet having N and S poles. Also, the magnet 23 may be a monopole magnet or a multipole magnet.

The magnet 23 drives the rotating member 30 by using its magnetic field. The yoke 23 forms a passage of the magnetic field for increasing the efficiency of a magnetic field.

The rotating member 30 is rotatably coupled to the inside of the fixing member 20.

The rotating member 30 is formed in a rectangular or rhombus shape and surrounds the optical path. The rotating member 30 has a structure suitable for fixing the displacement plate 31.

As described above, the displacement plate 31 is a light transmitting element that rotates at a predetermined angle for a short time and changes the position at which an image is displayed.

For this purpose, the displacement plate 31 may be disposed perpendicular to the optical path or inclined at a predetermined angle relative to the optical path. Thus, the incident angle of the light incident on the displacement plate is periodically changed.

The rotating member 30 includes shafts 32 on both sides and is rotatably connected to the fixing member 20 through shaft inserting grooves 27. Preferably, the rotating member 30 further includes first and second bearings 33 and 36. Here, the shaft 32 serves as a rotation center axis of the rotating member 30 or the displacement plate 31, and the rotation center axis is perpendicular to the optical path.

The first bearing 33 is formed in an approximately cylindrical shape and the shaft 32 is inserted into the first bearing 33. The firs bearing 33 is disposed on the shaft inserting groove 27 of the fixing member 20.

The second bearing 36 makes an outer diameter of the rotating member 30 so large that the rotating member 30 can be caught by an inner surface of the fixing member 20. That is, the rotating member 30 that is inserted into the fixing member 20 cannot move in a left lateral direction due to the second bearing 36. Also, an engaging member, e.g., a leaf spring 24 is formed at the right lateral side of the first bearing 33, such that the rotating member 30 cannot move in a right lateral direction. The elasticity of the leaf spring 24 secures a proper motion while fixing the rotating member, such that the rotating member 30 can rotate in a smooth manner. In such a state that only one end of the leaf spring 24 is coupled to the fixing member 20, the leaf spring 24 supports the rotating member 30.

A first cover 25 and a second cover 26 are disposed on upper sides of the first and second bearings 33 and 36 so that the rotating member 30 cannot be released in the upwards direction.

The first cover 25 is coupled to the fixing member 20 by two screws, and the second cover 26 is partially coupled to the fixing member 20 by one screw. The covers are provided to secure a proper motion to enable the rotating member 30 to rotate smoothly.

The second cover 26 provides a proper elastic force and it is similar in operation to the leaf spring 24.

In other words, the second cover 26 serves as an elastic member that can fix the rotating member 30 to the fixing member 20 while securing a desired motion of the rotating member 30.

A coil 35 is provided at one side of the rotating member 30, that is, at the side opposite to the magnet 23 formed in the fixing member 20.

Figure 12:
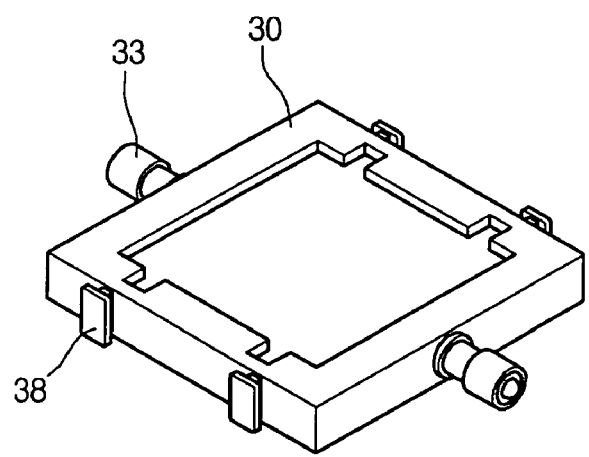
FIG. 12 is a view of the resolution improving apparatus containing a coil holder according to the present invention.

Referring to FIG. 12, in order to easily install the coil 35, a coil holder 38 is provided at the side of the rotating member 30, whereby the coil 35 can be supported and fixed by the coil holder 38. The coil is formed in a rectangular shape or a racetrack shape. Thus, the rotating member 30 can move past the magnet 23 in the direction of the current.

Thus, when power is supplied to the coil 35 through a power line 34, a current flows through the coil 35 and thus an attractive force and a repulsive force are generated due to an interaction with the magnet 23 provided at the fixing member 20, thereby causing the rotating member 30 to rotate. The rotating member 30 rotates about the rotation center axis in a clockwise or counterclockwise direction depending on the direction of the current applied to the coil 35.

Although not shown, according to another embodiment, a magnet may be provided in the side of the rotating member. In this embodiment, a coil holder is provided in the side of the fixing member opposite to the magnet, and a coil is supported by the coil holder.

As shown in FIG. 10, the displacement plate 31 is coupled to the rotating member 30. The displacement plate is positioned on a protrusion 39 formed at an inside of the rotating member 30, and then fixed by a engaging member 37. A detail shape of the protrusion 39 is shown in FIG. 9.

In addition, the displacement plate 31 may be injected together with the rotating member 30. In this case, the displacement plate 31 can be fixed to the rotating member 30 without any additional engaging member 37.

As shown in FIG. 11, a stopper 28 is provided at the inside of the fixing member 20 so as to limit a rotation angle of the rotating member 30. Thus, due to the stopper, the rotational range of the rotating member 30 is limited to be below a predetermined angle due to an external impact or an erroneous operation or an excessive operation.

Figure 13:
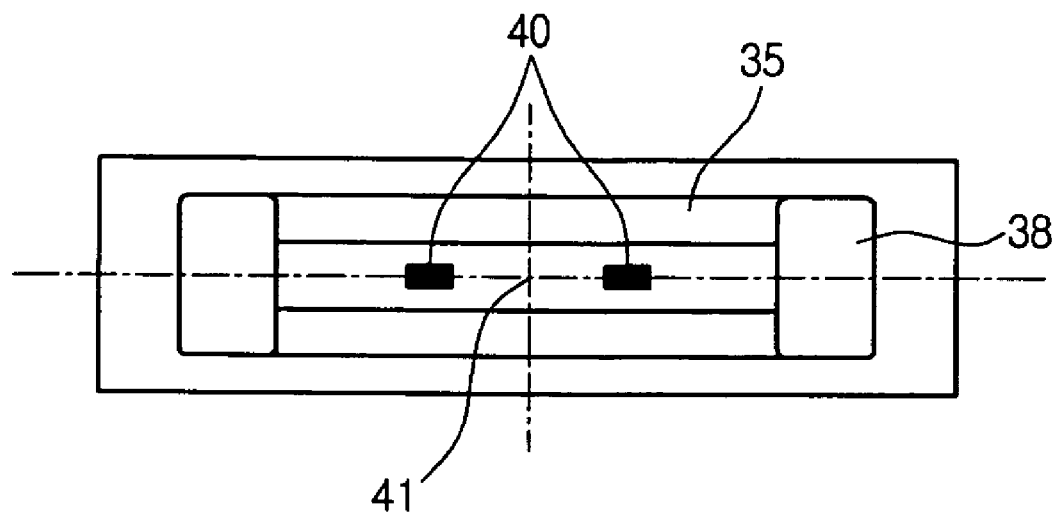
FIG. 13 is a view showing the use of an iron fragment formed at a side of the rotating member according to the present invention.

In FIG. 13, an iron fragment is provided at a side of the rotating member 30 so as to control the rotating member 30 more accurately. In FIG. 12, the iron fragment 40 is shown in more detail.

Figure 14:
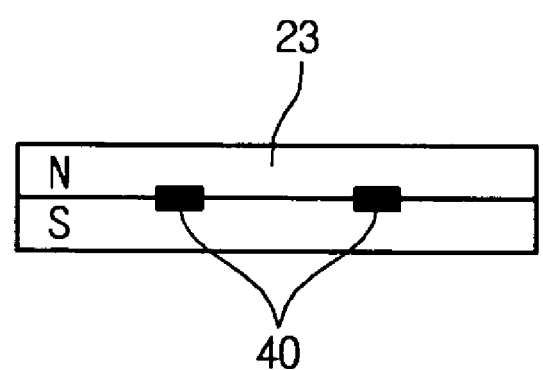
FIG. 14 is a view illustrating a position of the iron fragment with respect to a magnet according to the present invention.

The iron fragment 40 allows the rotating member 30 to operate linearly. As shown in FIG. 14, the iron fragment 40 is formed in a side of the rotating member 30 and opposing the center of the dipole magnet 23. That is, the iron fragment 40 can be disposed at the center 41 of the coil 35 or can be bilaterally symmetrical with the center 41 of the coil 35.

When only one iron fragment 40 is provided, it is disposed at the center 41 of the coil 35.

As shown in FIG. 13, when two iron fragments 40 are provided, they are disposed at locations that are bilaterally symmetrical with respect to the center 41 of the coil 35. That is, the iron fragments 40 are formed in a rectangular or racetrack shape and are disposed at the center of the coil 35 or at locations that are bilaterally symmetrical with respect to the center of the coil 35.

This makes use of a property that the iron fragments 40 moves to the center of the magnetic force under the influence of line of the magnetic force. When the rotating member 30 changes to the location (angle) shown in FIG. 7 during the iterative location change of the rotating member 30, the iron fragment 40 can cause the rotating member 30 to change to the accurate location (angle).

In another embodiment, the rotating member 30 can rotate by controlling the current by forming the coil 35 and the iron fragment 40 at the fixing member 20 and forming the magnet 23 at the rotating member 30.

The resolution improving apparatus of the present invention is disposed in the optical path of the display device and is rotated due to the interaction of the coil 35 and the magnet 23 depending on the applied control current.

Preferably, the rotation range of the rotating member 30 can be set within ±0.75° and can be rotated such that it is periodically disposed at the first location and the second location.

The rotating member 30 rotates at least one time while an image signal of one frame is applied, whereby the resolution that the user visually feels can be remarkably improved.

As described above, an image of one frame is separated into the first image and the second image and is periodically displayed at different locations on the screen. In this manner, the observer visually feels as if there are a large number of pixels, such that the resolution can be improved using the same number of the pixels.

Accordingly, the resolution of the large-sized display device can be effectively improved at a low cost.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A display device comprising:
   a light source;
   an image forming unit for forming an image using light emitted from the light source and an inputted image signal;
   a projection unit for projecting the image formed by the image forming unit onto a screen;
   a movable displacement unit for displacing the image displayed onto the screen; and
   a driving unit for driving the displacement unit, the driving unit including a coil, an iron fragment, and a dipole magnet.

2. The display device according to claim 1, wherein the displacement unit includes:
   a rotating member to which a displacement plate is fixed; and
   a fixing member to which the rotating member is rotatably coupled.

3. The display device according to claim 2, wherein the coil and the iron fragment are disposed in the rotating member and the dipole magnet is disposed in the fixing member, opposing the coil and the iron fragment.

4. The display device according to claim 3, wherein the coil and the fragment are disposed on both sides of the rotating member, and the dipole magnet is disposed on a surface opposing the coil and the fragment.

5. The display device according to claim 3, wherein the coil is formed in a rectangular shape or a racetrack shape.

6. The display device according to claim 3, wherein the iron fragment is disposed at the center of the coil.

7. The display device according to claim 3, wherein the iron fragment is disposed at positions symmetrical with respect to the center of the coil.

8. The display device according to claim 3, further comprising a yoke disposed at an opposite side of the dipole magnet, which opposes the coil, for forming a passage of a magnetic field.

9. The display device according to claim 2, wherein the coil and the iron fragment are disposed in the fixing member, and the dipole magnet is disposed in the rotating member opposed to the coil and the iron fragment.

10. The display device according to claim 9, wherein the coil and the iron fragment are disposed on both sides of the fixing member, and the dipole magnet is disposed at a side opposing the coil and the iron fragment.

11. The display device according to claim 9, wherein the coil is formed in a rectangular shape or a racetrack shape.

12. The display device according to claim 9, wherein the iron fragment is disposed at the center of the coil.

13. The display device according to claim 9, wherein the iron fragment is disposed at positions symmetrical with respect to the center of the coil.

14. The display device according to claim 9, further comprising a yoke disposed at the opposite side of the dipole magnet, which is opposed to the coil, for forming a passage of a magnetic field.

15. A display device comprising:
   a light source;
   an image forming unit for forming an image using light emitted from the light source and an inputted image signal;
   a projection unit for projecting the image formed by the image forming unit onto a screen;
   an optical path changing unit disposed on the optical path through which the image is projected, for changing the optical path; and
   a driving unit for driving the optical path changing unit,
   wherein the optical path changing unit include a fixing member disposed in the optical path, and a rotating member rotatably coupled to the fixing member and to which a displacement plate is fixed, and
   the driving unit includes a coil and an iron fragment disposed at one of the fixing member and the rotating member, and a dipole magnet disposed at the other of said fixing member and said rotating member.

16. The display device according to claim 15, wherein the coil and the iron fragment are disposed in the rotating member, and the dipole magnet is disposed in the fixing member opposed to the coil and the iron fragment.

17. The display device according to claim 16, wherein the coil and the iron fragment are disposed on both sides of the rotating member, and the dipole magnet is disposed at a side opposing the coil and the iron fragment.

18. The display device according to claim 16, wherein the coil is formed in a rectangular shape or a racetrack shape.

19. The display device according to claim 16, wherein the iron fragment is formed at the center of the coil.

20. The display device according to claim 16, wherein the iron fragment is disposed at positions symmetrical with respect to the center of the coil.

21. The display device according to claim 16, further comprising a yoke disposed at an opposite side of the dipole magnet, which is opposed to the coil, for forming a passage of a magnetic field.

22. The display device according to claim 15, wherein the coil and the iron fragment are disposed on the fixing member, and the dipole magnet is disposed on the rotating member opposed to the coil and the iron fragment.

23. The display device according to claim 22, wherein the coil and the iron fragment are disposed on both sides of the fixing member, and the dipole magnet is disposed at a side opposed to the coil and the iron fragment.

24. The display device according to claim 22, wherein the coil is formed in a rectangular shape or a racetrack shape.

25. The display device according to claim 22, wherein the iron fragment is disposed at the center of the coil.

26. The display device according to claim 22, wherein the iron fragment is disposed at locations symmetrical with respect to the center of the coil.

27. The display device according to claim 22, further comprising a yoke disposed at an opposite side of the dipole magnet, which is opposed to the coil, for forming a passage of a magnetic field.

* * * * *